L. H. NASH.
WATER METER.
APPLICATION FILED JULY 2, 1914. RENEWED APR. 12, 1917.

1,228,693. Patented June 5, 1917.

Witnesses:

Lewis Hallock Nash, Inventor
By his Attorneys

UNITED STATES PATENT OFFICE.

LEWIS HALLOCK NASH, OF SOUTH NORWALK, CONNECTICUT.

WATER-METER.

1,228,693.  Specification of Letters Patent.  Patented June 5, 1917.

Application filed July 2, 1914, Serial No. 848,526. Renewed April 12, 1917. Serial No. 161,674.

*To all whom it may concern:*

Be it known that I, LEWIS HALLOCK NASH, a citizen of the United States, and a resident of South Norwalk, in the county of Fairfield and State of Connecticut, have invented certain new and useful Improvements in Water-Meters, of which the following is a specification.

My invention relates to new and useful improvements in water meters, and more particularly to water meters of the type including a main casing containing the measuring and indicating mechanism, the measuring mechanism consisting of a rotatory piston mounted within a piston chamber supported within said main casing and wherein the main casing is composed of a plurality of parts adapted to be separated upon freezing of water within the casing, in order to prevent injury to the mechanism.

The primary object of the invention is to provide a meter of novel construction in which the separation of the main casing parts due to freezing of water within the same will not result in serious damage to the piston chamber or the piston contained therein, and to provide a piston chamber which will readily separate so that the freezing of water within the piston chamber will not permanently injure the same or the piston. I accomplish these objects by constructing the main casing with a wall, preferably a bottom or base, adapted to be separated from said main casing upon freezing of the water within the casing, in combination with a piston chamber construction of readily separable parts so held in assembled relation under normal working conditions as to readily separate from the meter casing and from each other in case of freezing so as not to be broken, and permit easy dislodgment of the piston from the piston chamber without injury.

The invention consists in the improvements to be more fully described hereinafter, and the novelty of which will be particularly pointed out and distinctly claimed.

I fully and clearly illustrate my invention in the accompanying drawings, to be taken as a part of this specification, and wherein—

Figure 1:
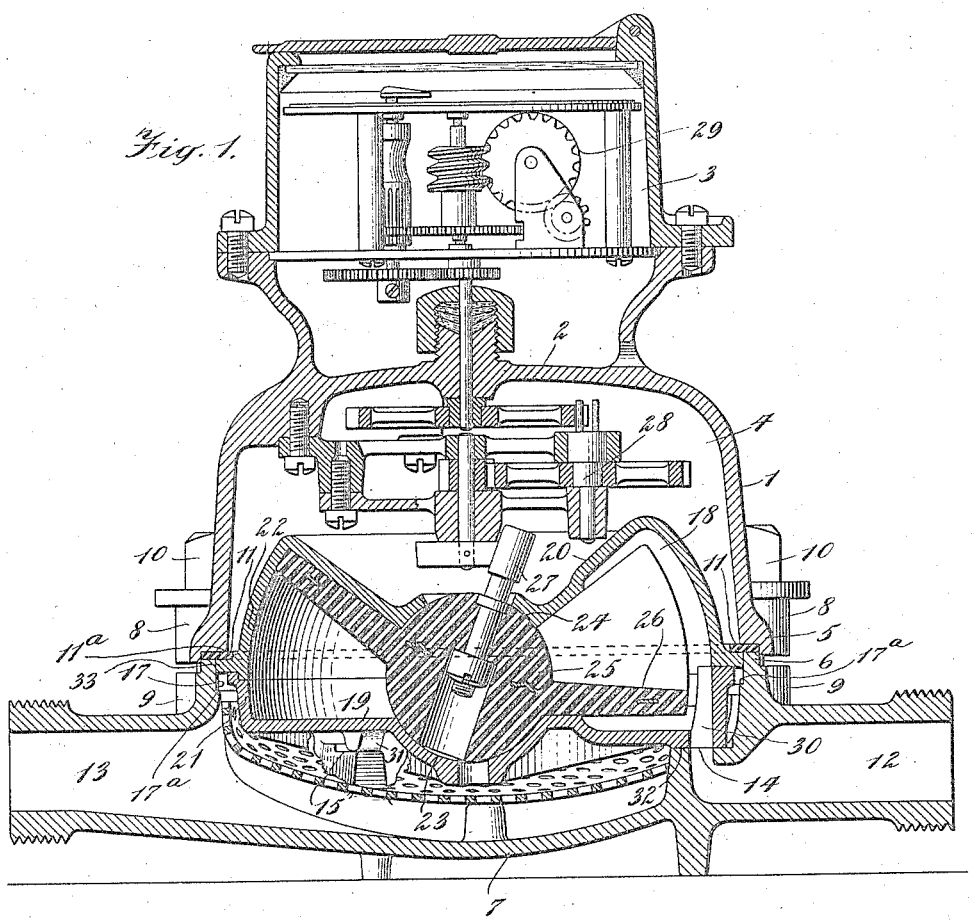
Figure 1 is a view in vertical section of a meter structure constituting one embodiment of my invention.
Figure 2:
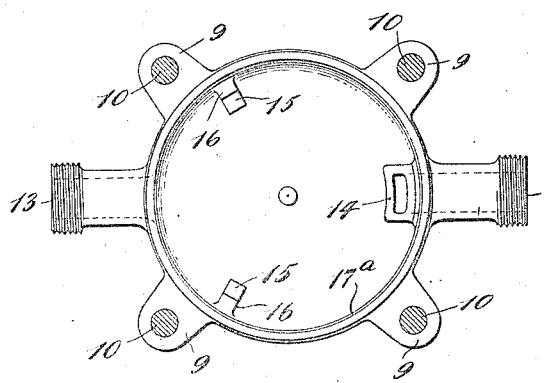
Fig. 2 is a plan view of the bottom or base of the meter casing.
Figure 3:
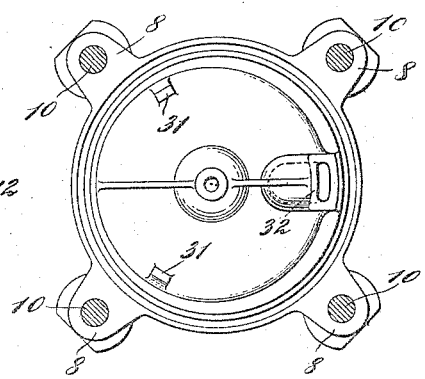
Fig. 3 is a bottom plan view of the piston chamber showing the same in position in the body or main portion of the meter casing.

Referring to the drawings by characters of reference 1 designates the main body portion of a meter casing, divided by a transverse diaphragm or partition 2 into upper and lower chambers 3, 4, respectively, the latter being open at its lower portion and having an overhanging annular edge flange 5 engaging and setting over an annular flange 6 on a wall, preferably the base or bottom part 7, which closes the lower end of said chamber 4. The lower edge portion of the casing 1, and the said base are provided with apertured ears or projections 8, 9, respectively, the projections on one member overlying those on the other member and secured together by clamping bolts 10 let through the apertures in the ears, whereby the main casing and base are clamped together with a watertight joint. Suitable packing 11 may be arranged between the upper edge of said flange 6 and the lower edge of the casing 1. The inner lower edge of the casing 1 is preferably so constructed that its inner edge projects inward beyond the inner edge of the said flange 6, as clearly shown in Fig. 1 of the drawing, to form an overhanging shoulder 11$^a$.

The base 7 is provided with an inlet coupling 12 and an outlet coupling 13, the passage of said inlet coupling opening into said base through a ledge or shoulder 14, the upper surface of which is preferably horizontal and in the same plane with the upper surface 15 of supporting lugs 16, disposed at desired points about the inside of said base and preferably cast integral with the latter. The flange 6 is formed on its inner face with an annular circumferential recess or rabbet 17, at the base of which is formed an annular shoulder 17$^a$, said ledge, lugs and recess serving a purpose to be presently described. 18 designates generally a piston chamber comprising a lower plate 19, and an upper plate or dome 20, said lower plate being provided with a circumferential upstanding flange 21 coöperating with a circumferential flange 22 on the said upper plate and united thereto by a watertight joint to form the piston chamber. This joint is preferably a lap- or slip-joint, as clearly shown in Fig. 1. The lower plate 19 is formed with a central recess 23, and the upper section 20 with a central recess 24, said recesses being spherical to form a bearing to receive the bearing ball 25 of a nutating disk piston 26. The piston is provided with a stub shaft 27, to drive a transmission mechanism 28 in the chamber 4, which mechanism in turn drives the indicating mechanism 29 in the chamber 3. The inlet for the piston chamber is shown at 30 opening through the said bottom plate 19, and communicating with said inlet coupling 12. The other portions and parts of said chamber and piston need not be described as they are of well known construction and form specifically no part of my present invention.

The said lower plate 19 is provided on its under surface with depending lugs 31 adapted to rest on the faces 15 of said lugs 16, and said plate is also provided with a projection 32 adapted to rest on said ledge 14, while the upper section 20 of the piston chamber is provided with a circumferential projecting flange 33, which projects into the recess or rabbet 17, heretofore described, and beneath the said shoulder 11ª and packing 11. The arrangement is such that when the clamping bolts 10 are operated to clamp the main casing 1 to the wall or base 7, the shoulder 11ª acts on the said flange 33 to press the lower edge of the piston chamber part 20 into engagement with the flange 21 on the said base plate 19, of the piston chamber, and forces said base plate down onto the lugs 16 and the said ledge 14. It will thus be seen that as long as the parts 1 and 7 of the meter casing are assembled the parts of the piston chamber will be held in proper relation to each other, and said piston chamber will be maintained in proper operative position within the meter casing. Should the freezing of water within the meter casing force the parts 1 and 7 of the meter casing apart it will be apparent that the base plate 19 of the piston chamber will be free to move downward, so that should freezing take place within the piston chamber, said base plate 19, being not held to the part 20 by any fastening device, will be free to move down under the force of the expanding water, and the piston will be free to drop down or be moved down by the ice without injury.

What I claim and desire to obtain by Letters Patent of the United States is

1. In a water meter, a casing comprising a base, provided with inlet and outlet passages, and an upper portion separable therefrom, and a piston chamber within the casing comprising separable lower and upper members, the upper member having a lateral projection clamped between the lower member and the upper portion of the casing.

2. In a water meter, a casing comprising a base, provided with inlet and outlet passages, and an upper portion separable therefrom, the upper portion having a shoulder overhanging a portion of the base, and a piston chamber within the casing comprising a lower member resting on the base, and an upper member provided with a circumferential flange that extends beneath said shoulder on the upper portion of the casing, for the purpose described.

3. In a water meter, a casing, a wall closing said casing and separable therefrom, said casing having a shoulder facing said wall, and said wall having a shoulder facing said first-named shoulder but spaced therefrom, a piston chamber in the casing and composed of readily separable parts, one part having a flange projecting between said shoulders and the other part being held in contact with said first-named part solely by said wall, and means for clamping said casing and wall together.

4. In a water meter, a casing, a wall closing said casing and separable therefrom, said casing having a shoulder facing said wall, and said wall having a shoulder facing said first-named shoulder but spaced therefrom, a piston chamber in the casing and composed of readily separable parts, one part having a flange projecting between said shoulders and the other part, being located between said casing and wall, and being held in contact with said first-named part solely by said wall, and means for clamping said casing and wall together.

5. In a water meter, a casing, a wall closing said casing and separable therefrom, a piston chamber in the casing and composed of separable sections held in engagement solely by said casing and wall, lugs on said wall, lugs on one of said sections contacting the lugs on the wall, and means for clamping said casing and wall together.

6. In a water meter, a casing comprising an upper portion and a base separable therefrom, said upper portion having an inwardly extending projection, a piston chamber within said casing and comprising a bottom plate supported solely by said base, and a top plate having a lateral flange engaged by said projection.

7. In a water meter, a casing comprising an upper portion and a base separable therefrom, said upper portion having an annular shoulder facing said base, a piston chamber within said casing and comprising a bottom plate supported solely by said base, and a top plate having a lateral flange engaged by the shoulder, and means for clamping the upper portion of said casing and said base together whereby said chamber plates are held in place and in engagement with each other.

8. In a water meter, a casing comprising an upper portion and a base separable therefrom, said upper portion having a shoulder facing said base, and said base having inwardly projecting lugs, a piston chamber within said casing and comprising a bottom plate having lugs resting upon the first-mentioned lugs, and a top plate having a slip connection with said bottom plate and having a lateral flange engaged by said shoulder, and means for clamping the upper portion of said casing and said base together.

In testimony whereof I have hereunto signed my name in the presence of two subscribing witnesses.

LEWIS HALLOCK NASH.

Witnesses:
 W. A. PAULING,
 M. E. McNINCH.